(12) United States Patent
Haas et al.

(10) Patent No.: US 11,659,897 B2
(45) Date of Patent: May 30, 2023

(54) SEAT BELT BUCKLE AND METHOD FOR MANUFACTURING A SEAT BELT BUCKLE

(71) Applicant: ZF AUTOMOTIVE GERMANY GMBH, Aldorf (DE)

(72) Inventors: Peter Haas, Eschach (DE); Andrea Schüch, Schwäbisch Gmünd (DE); Hans-Peter Betz, Böbingen (DE); Jörg Meyer, Alfdorf-Adelstetten (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 0 days.

(21) Appl. No.: 17/274,616

(22) PCT Filed: Aug. 15, 2019

(86) PCT No.: PCT/EP2019/071938
§ 371 (c)(1),
(2) Date: Mar. 9, 2021

(87) PCT Pub. No.: WO2020/052902
PCT Pub. Date: Mar. 19, 2020

(65) Prior Publication Data
US 2022/0047044 A1     Feb. 17, 2022

(30) Foreign Application Priority Data

Sep. 12, 2018  (DE) .................... 10 2018 122 239.4

(51) Int. Cl.
*A44B 11/25* (2006.01)
*B60Q 3/242* (2017.01)

(52) U.S. Cl.
CPC .......... *A44B 11/2565* (2013.01); *B60Q 3/242* (2017.02)

(58) Field of Classification Search
CPC ............................ A44B 11/2565; B60Q 3/242
See application file for complete search history.

(56) References Cited

U.S. PATENT DOCUMENTS

2017/0127765 A1* 5/2017 Betz .................... A44B 11/2561

FOREIGN PATENT DOCUMENTS

| CN | 105555621 A | 5/2016 |
|---|---|---|
| DE | 202012012254 U1 | 2/2013 |

(Continued)

OTHER PUBLICATIONS

PCT International Search Report for corresponding International Application Serial No. PCT/EP2019/071938, dated Oct. 11, 2019, pp. 1-4.

*Primary Examiner* — Thomas M Sember
(74) *Attorney, Agent, or Firm* — Tarolli, Sundheim, Covell & Tummino LLP

(57) ABSTRACT

The invention describes a belt buckle (10) for a motor vehicle comprising a belt buckle housing (12) as well as a lighting unit (20) present in the area of a tongue insertion opening (36) and including a lamp (22) and a light conductor (16). A front panel (14) surrounding the tongue insertion opening (36) is provided which limits the belt buckle (10) on the end face. The front panel (14) is coupled to the belt buckle housing (12) via at least one detent mechanism (24, 30) such that the light conductor (16) provided at least partially between the front panel (14) and the belt buckle housing (12) is aligned. The invention further describes a method for manufacturing a belt buckle (10).

17 Claims, 2 Drawing Sheets

(56) References Cited

FOREIGN PATENT DOCUMENTS

| | | |
|---|---|---|
| DE | 102014016520 A1 | 5/2016 |
| DE | 102016204961 A1 | 9/2017 |
| WO | 2016/008585 A1 | 1/2016 |
| WO | 2016/097089 A1 | 6/2016 |
| WO | 2017/025499 A1 | 2/2017 |

* cited by examiner

SEAT BELT BUCKLE AND METHOD FOR MANUFACTURING A SEAT BELT BUCKLE

RELATED APPLICATIONS

The present invention is a U.S. National Stage under 35 USC 371 patent application, claiming priority to Serial No. PCT/EP2019/071938, filed on 15 Aug. 2019; which claims priority from 10 2018 122 239.4, filed 12 Sep. 2018, the entirety of both of which are incorporated herein by reference.

BACKGROUND OF THE INVENTION

The invention relates to a belt buckle for a motor vehicle, comprising a belt buckle housing and a lighting unit. In addition, the invention comprises a method for manufacturing a belt buckle.

A belt buckle is part of a safety device in a motor vehicle, with the belt buckle being tightly connected to the body of the vehicle. A plug-in tongue at which webbing is provided for partially encompassing, when the plug-in tongue is inserted, a vehicle occupant to fix the latter to the vehicle seat in the case of strong deceleration of the vehicle, can be inserted into a belt buckle.

It is generally known from prior art that belt buckles of this type are provided with lighting units which serve to mark the tongue insertion opening so that the vehicle occupant can locate the belt buckle, especially the tongue insertion opening, more quickly. Quick locating of the belt buckle, in particular in the dark, increases the belt-wearing rate as the vehicle occupant need not look for the belt buckle, which may decrease the motivation to fasten seatbelts. The lighting unit therefore is intended to ensure reliable and permanent lighting of the tongue insertion opening.

The belt buckles known from prior art usually include a belt buckle housing that has been manufactured by a welding process in which two housing halves have been integrally connected to each other. Due to said integral connection, the lighting unit can be exchanged with considerable effort only, which is a drawback.

Moreover, the construction space inside the belt buckle is limited, therefore a very compact design of the lighting unit is required, which entails high costs.

In general, the tongue insertion opening is intended to be illuminated extensively and with high light intensity so that the vehicle occupant can locate the tongue insertion opening even in the case of unfavorable positions of the belt buckle.

In order to reduce the manufacturing costs, simple assembly of the belt buckle is generally desirable, while at the same time high precision is required to guarantee reliable and permanent lighting of the tongue insertion opening.

SUMMARY OF THE INVENTION

It is the object of the invention to provide a belt buckle for a motor vehicle that can be manufactured at low cost and simultaneously enables proper and permanent illumination of the tongue insertion opening.

According to the invention, the object is achieved by a belt buckle for a vehicle, comprising a belt buckle housing and a lighting unit present in the area of a tongue insertion opening which comprises a lamp and a light conductor, wherein a front panel surrounding the tongue insertion opening is provided for limiting the belt buckle at the end face, and wherein the front panel is coupled to the belt buckle housing via at least one detent mechanism so that the light conductor provided at least partially between the front panel and the belt buckle housing is aligned.

Furthermore, according to the invention the object is achieved by a method for manufacturing a belt buckle in which a belt buckle housing, a light conductor and a front panel are provided. The front panel is coupled to the belt buckle housing via at least one detent mechanism so that the light conductor provided at least partially between the front panel and the belt buckle housing is aligned.

It is the fundamental idea of the invention to design the belt buckle in such a way that it can be easily assembled, wherein, when assembling the belt buckle, the front panel locks with the belt buckle housing and, at the same time, along with the belt buckle housing aligns the light conductor. On the one hand, this results in simple and low-cost manufacture and, resp., assembly of the belt buckle. On the other hand, the lighting unit is ensured to be capable of reliably and permanently illuminating the tongue insertion opening, as the light conductor is aligned to adopt the predefined position via the front panel.

The light conductor may include an outcoupling area assigned to the edge of the belt buckle, with the edge of the belt buckle corresponding to the portion of the belt buckle which is located directly in the visual range of the vehicle occupant, when the belt buckle adopts its typical position in the vehicle. Insofar, the tongue insertion opening is ensured to be properly illuminated so that the vehicle occupant can easily locate the same even in the case of unfavorable positions of the belt buckle. The outcoupling area of the light conductor may be configured to be circumferential. In this respect, the outcoupling area of the light conductor can annularly enclose the tongue insertion opening.

Basically, the light conductor can be configured so that it passes the light emitted by the lamp to the end face of the belt buckle so that the lamp can be disposed inside the belt buckle housing at a protected position where in addition more space is available than directly in the area of the end face.

The lamp may be a LED which has a very compact design.

The light conductor may be partly disposed in the belt buckle housing with form closure, wherein the light conductor is aligned with respect to the belt buckle housing via the front panel which locks with the belt buckle housing during assembly. This allows for an especially compact design of the belt buckle, as the light conductor need not be fastened by means of fasteners to the belt buckle housing or any other component of the belt buckle, but is held clamped in the aligned position between the front panel and the belt buckle housing via the detent mechanism.

One aspect provides that the belt buckle comprises a diffusor assigned to the light conductor, especially wherein the detent mechanism ensures that the diffusor provided between the front panel and the belt buckle housing is aligned. The diffusor interacts with the light conductor so that the light emitted by the light conductor, especially via the outcoupling area, is transmitted to the diffusor through which diffuse light is emitted. For this purpose, the diffusor may be disposed between the front panel and the light conductor so that the diffusor provides the exit surface of the light.

Analogously, the diffusor is accordingly aligned by the front panel during assembly. If the front panel locks with the belt buckle housing via the at least one detent mechanism, at the same time the diffusor is aligned so that it adopts the desired orientation and position within the belt buckle.

Accordingly, the diffusor may be received to be equally clamped between the front panel and the belt buckle housing.

Accordingly, the front panel can at least partially define and, resp., delimit a receiving space in which the diffusor and/or the light conductor is/are at least partly received.

The front panel may include a stop against which the diffusor abuts, with the diffusor being free via its exit surface at the end face, and thus is not limited by the front panel. This makes sure that the light exiting via the diffusor can be perceived by the vehicle occupant at the exit surface.

Analogously, the belt buckle housing may include a stop face for the light conductor against which the light conductor abuts in the assembled state. In particular, the light conductor in the assembled state is forced against the stop face of the belt buckle housing by the front panel (via the diffusor).

Consequently, the light conductor is held clamped between the stop of the front panel and the stop face on the belt buckle housing.

If the optional diffusor is provided, the diffusor and the light conductor are held clamped between the stop of the front panel and the stop face on the belt buckle housing, the light conductor being disposed between the stop face and the diffusor which, in turn, is disposed between the light conductor and the stop.

The circumferentially configured outcoupling area of the light conductor can interact with the diffusor so that the light coupled out via the outcoupling area is coupled into the diffusor. Insofar, also the diffusor can annularly enclose the tongue insertion opening.

In other words, the light conductor and the diffusor are configured to be substantially annular or closed in a plane normal to the plug-in direction. The shape of the light conductor and the diffusor may be different from a circular ring.

According to one embodiment, the detent mechanism comprises at least one first detent element and a first locking element interacting with the first detent element. The detent mechanism thus includes two different components that are interlocked during assembly of the belt buckle when the front panel is assembled to the belt buckle housing.

For example, the front panel includes the at least one first detent element. Alternatively, or additionally, the belt buckle housing includes the first locking element. Insofar, the first detent element and the first locking element which interact and form a first detent mechanism are disposed at different components of the belt buckle. In this respect, a self-contained belt buckle is formed when the front panel is coupled to the belt buckle housing via the detent element and, resp., the locking element.

Basically, the front panel is assigned to the front end face of the belt buckle, whereas the belt buckle housing is assigned, with its end opposed to the front panel, to a rear end face of the belt buckle. In that, the front panel and the belt buckle housing form the two opposed ends of the belt buckle.

In accordance with one embodiment, the at least one first detent element is a land having external teeth. Alternatively, or additionally, the first locking element is formed by a slit receiving the first detent element. Consequently, the first detent element which is in the form of a land having external teeth can be easily inserted into the slit receiving the detent element when the front panel is attached to the belt buckle housing. A form-fit fixation of the belt buckle in the assembled state is obtained via the corresponding teeth.

The slit receiving the first detent element may also be referred to as a pocket.

The slit may optionally be provided with internal teeth. Then in particular the external teeth are corresponding with the internal teeth so that they are adapted to each other. In this way, a very tension-proof detent connection can be formed.

In other words, the first detent element provided at the front panel as well as the first locking element provided at the belt buckle housing together constitute a fixation system through which all components of the belt buckle can be fixed to one another.

Said fixation system provides the detent mechanism.

Another aspect provides plural first detent elements and/or plural first locking elements. In particular, the plural first detent elements are provided on at least a first side of the front panel. Alternatively, or additionally, the plural first locking elements are provided on at least a first side of the belt buckle housing. The first side of the belt buckle housing is assigned to the first side of the front panel. In this way, a safe and permanent locking of the front panel with the belt buckle housing can be guaranteed, as plural detent elements and, resp., locking elements interact, thus allowing the working forces to be taken up homogenously so as to avoid load peaks on a first detent element and/or a first locking element.

In accordance with one embodiment, the at least one detent mechanism comprises at least one second detent element and a second locking element interacting with the second detent element. The front panel may include the at least one second detent element. Alternatively, or additionally, the belt buckle housing may include the second locking element. Basically, the second detent element and, resp., the second locking element may be designed differently from the first detent element and, resp., the first locking element. The second detent element and the second locking element form a second detent mechanism which acts especially in addition to the first detent mechanism.

Insofar, in the belt buckle two different types of detent elements and, resp., locking elements are provided.

The different types of detent and, resp., locking elements make sure that with particular forces which entail the release of a first detent mechanism at least the second detent mechanism is not released. Thus, inadvertent release of the detent connection comprising the first detent mechanism and the second detent mechanism can be efficiently prevented.

For example, the at least one second detent element is formed by a slit including internal teeth that receives the second locking element. Alternatively, or additionally, the second locking element is a land.

The slit receiving the second locking element may also be referred to as a pocket.

Insofar, the second locking element substantially corresponds to the first detent element, whereas the second detent element substantially corresponds to the first locking element.

The land may optionally include external teeth. The external teeth and the internal teeth may be corresponding so that the respective teeth engage to form a very tension-proof detent connection.

In particular, plural second detent elements and/or plural second locking elements are provided. The plural second detent elements may be provided on a second side of the front panel. Alternatively, or additionally, the plural second locking elements may be provided on a second side of the belt buckle housing. Analogously, this results in a more homogenous take-up of force via the second detent elements and, resp., locking elements, as they are provided in plurality. The second side of the belt buckle housing may be assigned to the second side of the front panel. Furthermore, the second side of the front panel and, resp., the second side of the belt buckle housing may be opposed to the respective first side.

In general, the belt buckle housing can be configured at least in two parts, wherein the first belt buckle housing part includes at least the first locking element, specifically the first locking element and the second locking element. Thus, the first belt buckle housing part can completely interact with the front panel, as it includes an annular portion to which the front panel is fastened. Hence, the first belt buckle housing part completely surrounds the tongue insertion opening. The second belt buckle housing part, on the other hand, merely serves to obtain access to the interior of the belt buckle housing so as to be able to replace, for example, the lighting unit or the lamp, if required. Insofar, the second belt buckle housing part may be configured as a flap or a sliding member.

Thus, the first belt buckle housing part can provide the peripheral stop face for the light conductor on which the light conductor abuts in the assembled state, i.e., when the front panel forces the light conductor against the belt buckle housing.

The front panel which is interlocked with the belt buckle housing via the two detent mechanisms thus presses the diffusor via its stop toward the light conductor so that the two of them are aligned with each other and relative to the belt buckle housing and the front panel. In that, the diffusor forces the light conductor via the diffusor against the stop face of the belt buckle housing.

The stop and/or the stop face may be configured so that they influence the orientation of the diffusor and, resp., the light conductor relative to the front panel and, resp., to the belt buckle housing. In other words, the diffusor and the light conductor correspondingly align themselves due to the contour of the stop and/or the stop face, whereby they are aligned also relative to each other to guarantee light transmission from the light conductor to the diffusor preferably without loss.

Furthermore, the front panel may comprise an application surface, especially a chrome surface surrounding the tongue insertion opening. The application surface can interact with the diffusor so that the light emitted by the diffusor, viz. the light emitted via the exit surface, is reflected by the application surface or, resp., is scattered once again by the application surface.

The entire front panel may be provided on its outside with the application surface.

BRIEF DESCRIPTION OF THE DRAWINGS

Further advantages and characteristics of the invention will be evident from the following description and the drawings which are referred to, wherein.

DESCRIPTION

Figure 1:
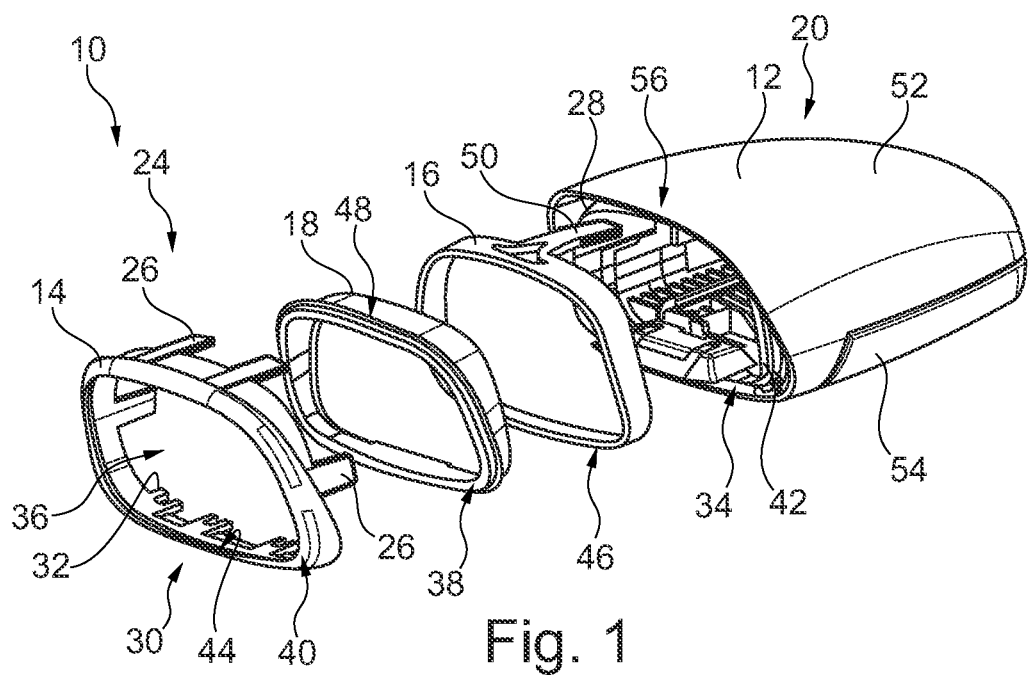
FIG. 1 shows an exploded view of a belt buckle according to the invention.
Figure 2:
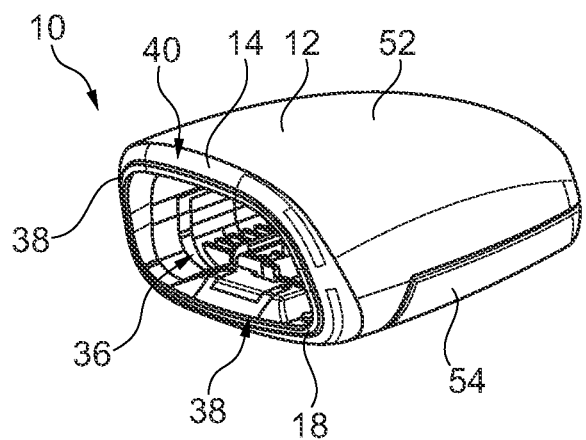
FIG. 2 shows a perspective view of the belt buckle from FIG. 1 in the assembled state.
Figure 3:
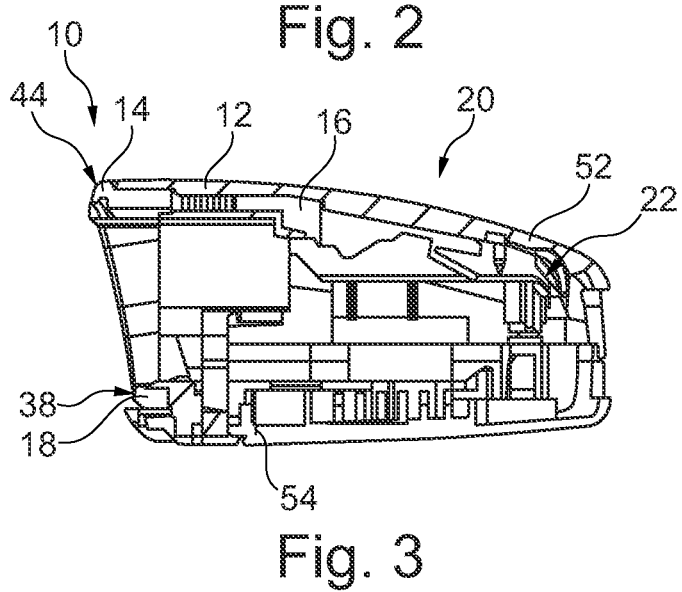
FIG. 3 shows a section across the belt buckle from FIG. 2 along the inserting direction.

FIGS. 1 to 3 illustrate a belt buckle 10 for a motor vehicle comprising a belt buckle housing 12 as well as a front panel 14.

Further, the belt buckle 10 includes a light conductor 16 as well as a diffusor 18 assigned to the light conductor 16. The light conductor 16 is part of a lighting unit 20 which additionally comprises a lamp 22 that is received in the belt buckle housing 12, as is visible from FIG. 3 showing a sectional view of the assembled belt buckle 10 along the inserting direction.

The front panel 14 is assigned to a front end face of the belt buckle 10, whereas the end of the belt buckle housing 12 facing away from the front panel 14 is assigned to an opposed second end face of the belt buckle 10.

From FIG. 1 it is clear already that the belt buckle 10 comprises a first detent mechanism 24 via which the front panel 14 can be coupled or interlock with the belt buckle housing 12.

The first detent mechanism 24 comprises at least one first detent element 26 that is disposed on the front panel 14 in the shown embodiment.

Moreover, the detent mechanism 24 comprises at least one locking element 28 interacting with the first detent element 26, the locking element 28 being provided on the belt buckle housing 12 in the shown embodiment.

In the illustrated embodiment, the first detent element 26 is a land having external teeth, whereas the first locking element 28 is formed by a slit receiving the first detent element 26.

The first locking element 28 in the form of a slit makes sure, due to its width, that the first detent element 26 in the form of a land and including the external teeth interlocks in the first locking element 28 when the front panel 14 is pushed onto the belt buckle housing 12. Especially, in so doing a form closure is resulting.

For example, the tips of the external teeth slide along the inner wall of the first locking element 28 in the form of a slit, in particular wherein the tips are somewhat yielding, thus causing the first detent element 26 to interlock with the first locking element 28.

It becomes further clear from FIG. 1 that the belt buckle 10 comprises, apart from the first detent mechanism 24, a second detent mechanism 30 that comprises a second detent element 32 as well as a locking element 34 interacting with the second detent element 32.

In the shown embodiment, the second detent element 32 is disposed on the front panel 14, whereas the second locking element 34 is provided on the belt buckle housing 12.

In the shown embodiment, the at least one second detent element 32 is formed by a slit having internal teeth and receiving the second locking element 34, whereas the second locking element 34 is formed by a land that can be received by the second detent element 32.

The second detent element 32 configured as a slit makes sure, due to its width, that the second locking element 34 in the form of a land interlocks in the first detent element 32, when the front panel 14 is pushed onto the belt buckle housing 12. Especially, in so doing a form closure is resulting.

For example, the tips of the internal teeth of the second detent element 32 slide along the outer wall of the second locking element 34 in the form of a land, especially wherein the tips are somewhat yielding, thus causing the second detent element 32 to interlock with the second locking element 34.

Insofar, the second locking element 34 is configured substantially identically to the first detent element 26 when the external teeth of the first detent element 26 are disregarded, whereas the second detent element 32 is configured substantially identically to the first locking element 28, when the internal teeth of the second detent element 32 are disregarded.

Basically, plural first detent elements 26 and plural second detent elements 32 are provided on the annularly formed front panel 14 which surrounds a tongue insertion opening 36 of the belt buckle 10, as is evident from FIG. 2.

Figure 4:
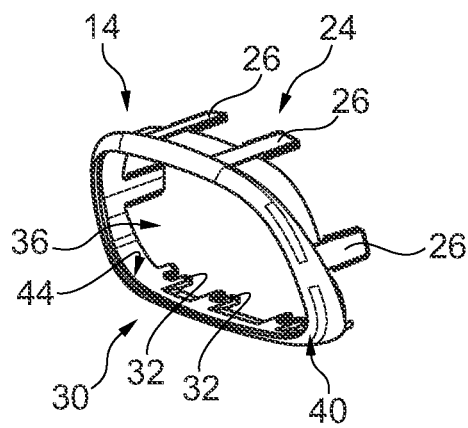
FIG. 4 shows a perspective view of the front panel of the belt buckle from FIGS. 1 to 3.

It becomes clear especially from FIGS. 1 and 4 that the at least one first detent element 26 is disposed, inter alia, on a first side of the front panel 14, whereas the at least one second detent element 32 is disposed exclusively on a second side of the front panel 14 opposed to the first side.

In addition, first detent elements 26 are disposed on the two sides interconnecting the first and second sides of the annularly formed front panel 14.

This allows to obtain homogenous application of force, thus ensuring a safe detent connection via the two detent mechanisms 24, 30.

The two detent mechanisms 24, 30 make sure that the light conductor 16 and the diffusor 18 can be disposed in the desired position and/or orientation on the belt buckle 10, and hence are aligned, when the belt buckle 10 is assembled, as shall be explained in the following.

Based on the exact alignment, optimum illumination of the tongue insertion opening 36 is safeguarded, as the diffusor 18 is aligned with the light conductor 16 of the lighting unit 20.

The light emitted from the lighting unit 20 reaches the diffusor 18 assigned to the front panel 14 and comprising an exit surface 38 which surrounds the tongue insertion opening 36 to optimally illuminate the same. Accordingly, the diffusor 18 makes sure that the vehicle occupant will not be dazzled by the emitting light.

The exit surface 38 of the diffusor 18 can be recognized from the front end face of the belt buckle 10 so that the vehicle occupant can quickly spot the light exiting at the exit surface 38.

Moreover, an application surface 40 on the front panel 14 which is configured as a chrome surface, for example, may be assigned to the exit surface 38 of the diffusor 18. The application surface 40 equally surrounds the tongue insertion opening 36, with the exit surface 38 of the diffusor 18 being provided between the application surface 40 and the tongue insertion opening 36.

The light exiting at the exit surface 38 can be incident, inter alia, on the application surface 40 which may have a metallic effect, thus causing the light exiting at the exit surface 38 to be reflected and, resp., additionally scattered by the application surface 40.

During assembly of the belt buckle 10, which is especially evident from FIGS. 6 to 9, the front panel 14 is coupled to the belt buckle housing 12 via the corresponding detent mechanisms 24, 30.

Accordingly, the front panel 14 (together with the belt buckle housing 12) aligns the diffusor 18 and the light conductor 16, thus ensuring each of the light conductor 16 and the diffusor 18 to take the desired orientation and, resp., position.

Figure 5:
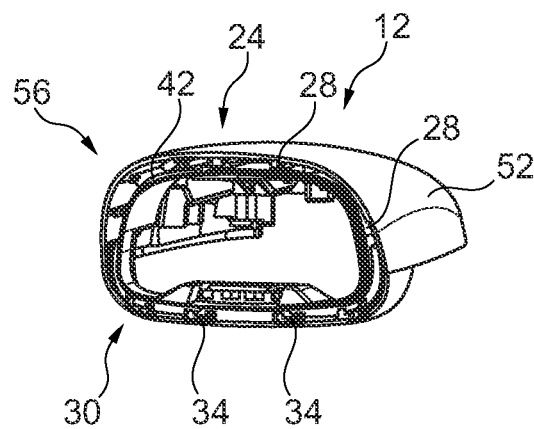
FIG. 5 shows a perspective view of a first belt buckle housing part of the belt buckle from FIGS. 1 to 3.
Figure 6:
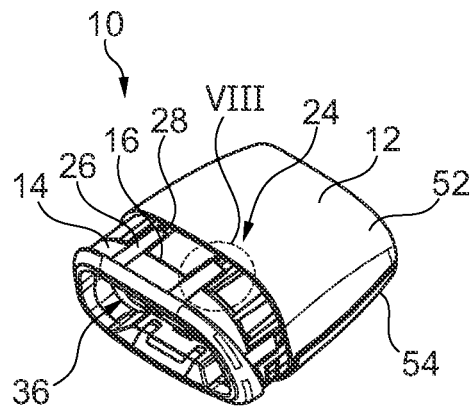
FIG. 6 shows a perspective view on the upper side of the belt buckle during assembly of the belt buckle according to the invention.
Figure 7:
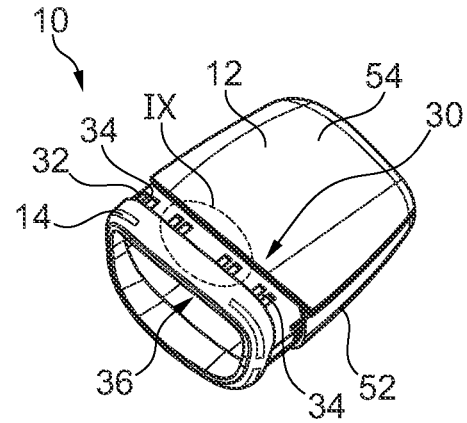
FIG. 7 shows a perspective view of the belt buckle of FIGS. 1 to 3 during assembly of the belt buckle according to the invention.
Figure 8:
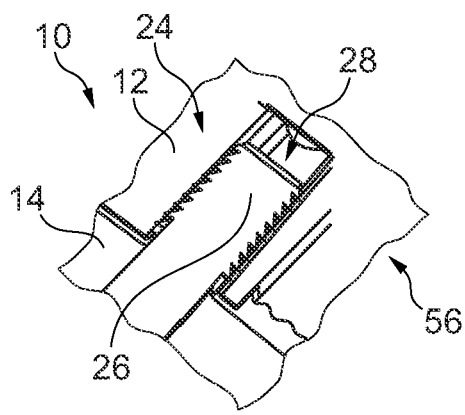
FIG. 8 shows a detail view of FIG. 6.
Figure 9:
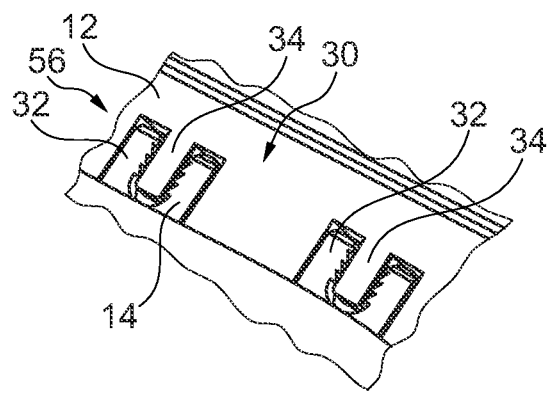
FIG. 9 shows a detail view of FIG. 7.

In order to achieve that, the light conductor 16 is forced against a stop face 42 of the belt buckle housing 12 which is clearly visible especially in FIG. 5. The stop face 42 may be circumferential so as to permit full-surface bearing of the light conductor 16.

The front panel 14 likewise comprises a stop 44 against which the diffusor 18 with an edge portion bears in the assembled state. The stop 44 and/or the edge portion of the diffusor 18 may be circumferential so as to permit full-surface bearing.

In the assembled state, thus the light conductor 16 and the diffusor 18 are held clamped between the front panel 14 and the belt buckle housing 12, in particular between the stop face 42 of the belt buckle housing 12 and the stop 44 of the front panel 14.

The stop face 42 and/or the stop 44 may have a geometry that interacts with the light conductor 16 and, resp., the diffusor 18 to appropriately move the latter to the desired orientation and position.

In other words, during assembly of the belt buckle 10, the light conductor 16 and, resp., the diffusor 18 at least partially slide along the stop face 42 and/or the stop 44 so that they are aligned.

Moreover, the light conductor 16 is configured so that it is at least partially surrounded by the diffusor 18 when the belt buckle 10 is assembled. To this end, the light conductor 16 includes an outcoupling surface 46 interacting with the diffusor 18 both mechanically and in terms of light conduction so that the light conducted by the light conductor 16 to the outcoupling surface 46 is transmitted to the diffusor 18.

Via the outcoupling surface 46, the light conductor 16 bears against the diffusor 18 which includes a coupling surface 48 which is assigned to the outcoupling surface 46 and is provided opposite to the exit surface 38.

Moreover, the light conductor 16 comprises a coupling land 50 interacting with the lamp 22 of the lighting unit 20 so that the light emitted by the lamp 22 is coupled into the light conductor 16 via the coupling land 50.

The light coupled into the light conductor 16 is conducted via the light conductor 16 to the outcoupling surface 46 which interacts with the input surface 48 so that the light is introduced to the diffusor 18 and then is outcoupled at the outcoupling surface 38 so as to illuminate the tongue insertion opening 36. The light emitted from the lamp 22 received in the belt buckle housing 12 thus becomes visible to the vehicle occupant.

Further, it is evident from the Figures that generally the belt buckle housing 12 is configured in two parts, as it comprises a first belt buckle housing part 52 and a second belt buckle housing part 54 which may be designed as a sliding or plug-in element that can be appropriately coupled to the first belt buckle housing part 52.

The first belt buckle housing part 52 includes a circumferential or annular bearing area 56 on which the stop face 42 is provided so that, during assembly of the belt buckle 10, the light conductor 16 is forced against the first belt buckle housing part 52.

In addition, at the bearing area 56 both the first locking elements 28 and the second locking elements 34 are provided which correspondingly interact with the first and second detent elements 26, 32 of the front panel 14 to align the light conductor 16 and the diffusor 18 during assembly of the belt buckle 10.

Consequently, it is generally ensured that the belt buckle 10, in particular the corresponding components of the belt buckle 10, i.e., the belt buckle housing 12, the light conductor 16, the diffusor 18 and the front panel 14, are positioned and oriented exactly relative to one another when the belt buckle 10 is being assembled, wherein this is effectuated merely based on the detent connection which comprises the two detent mechanisms 24, 30.

The detent mechanisms 24, 30 moreover make sure that the individual components of the belt buckle 10 and, resp., the belt buckle 10 are/is retained in the assembled state, even if high loads are acting upon the belt buckle 10, for example during acceleration or deceleration.

The plug-in or detent connection moreover makes sure that the lighting unit 20 can be easily replaced, if required.

Furthermore, due to the plug-in or detent connection, optical defects that might impair the illumination of the tongue insertion opening can be effectively prevented. Said defects might occur in the case of an integral connection and in the case of wrong or unfavorable orientation of the light conductor 16 and the diffusor 18.

The detent elements 26, 32 are formed specifically integrally with the front panel 14.

Similarly, the locking elements 28, 34 can be formed integrally with the belt buckle housing 12, especially with the first belt buckle housing part 52.

The first locking element 28 in the form of a slit may further be provided to include internal teeth, wherein the external teeth of the first detent element 26 and the internal teeth of the locking element 28 then are configured correspondingly so that they are engage with each other.

The second detent element 32, viz. the slit receiving the second locking element 34, may be provided with internal teeth which correspond to the external teeth of the second locking element 34.

For manufacturing the belt buckle 10, thus initially the belt buckle housing 12, the front panel 14, the light conductor 16 and the diffusor 18 are provided.

The lamp 22 may have been pre-installed already in the belt buckle housing 12.

Then the components of the belt buckle 10 are arranged relative to each other in the right order so that the light conductor 16 is assigned to the belt buckle housing 12 and the diffusor 18 is assigned to the front panel 14.

After that, the front panel 14 is coupled to the belt buckle housing 12, wherein the detent elements 26, 32 interact with the locking elements 28, 34 to form the detent connection between the front panel 14 and the belt buckle housing 12.

During assembly of the belt buckle 10, i.e., when the detent connection is established, the light conductor 16 and the diffusor 18 are simultaneously aligned so that they adopt the correct position and orientation within the belt buckle 10.

Insofar, the two detent mechanisms 24, 30 establish a safe detent connection of the belt buckle 10 by the front panel 14 assigned to the front end face interlocking with the belt buckle housing 12 assigned to the rear end face.

At the same time, the two detent mechanisms 24, 30 safeguard the desired position and orientation of the light-conducting components of the belt buckle 10, namely of the light conductor 16 and the diffusor 18, by aligning them during assembly via the belt buckle housing 12 and the front panel 14.

This is especially effectuated via the corresponding geometries of the stop face 42, the stop 44, the outcoupling surface 46 and the coupling surface 48.

Basically, in this way it is possible to finely adjust the locking balance during assembly of the belt buckle 10. Said fine adjustment further enables all components to be installed without any dimensional errors and optical defects.

The invention claimed is:

1. A belt buckle (10) for a motor vehicle, comprising a belt buckle housing (12) as well as a lighting unit (20) present in the area of a tongue insertion opening (36) and including a lamp (22), a light conductor (16) and a diffusor (18) assigned to the light conductor (16), wherein a front panel (14) surrounding the tongue insertion opening (36) is provided which limits the belt buckle (10) on the end face, and wherein the front panel (14) is coupled to the belt buckle housing (12) via at least one detent mechanism (24, 30) such that the light conductor (16) provided at least partially between the front panel (14) and the belt buckle housing (12) and the diffusor (18) provided between the front panel (14) and the belt buckle housing are aligned.

2. The belt buckle (10) according to claim 1, wherein the detent mechanism (24) comprises at least one first detent element (26) and a first locking element (28) interacting with the first detent element (26).

3. The belt buckle (10) according to claim 2 wherein the front panel (14) includes the at least one first detent element (26) and/or in that the belt buckle housing (12) includes the first locking element (28).

4. The belt buckle (10) according to claim 2, wherein the at least one first detent element (26) is a land having external teeth and/or in that the first locking element (28) is formed by a slit receiving the first detent element (26).

5. The belt buckle (10) according to claim 2, wherein plural first detent elements (26) and/or plural first locking elements (28) are provided.

6. The belt buckle (10) according to claim 5, wherein the plural first detent elements (26) are provided on at least one first side of the front panel (14) and/or the plural first locking elements (28) are provided on at least one first side of the belt buckle housing (12).

7. The belt buckle (10) according to claim 1, wherein the at least one detent mechanism (24, 30) comprises at least one second detent element (32) and a second locking element (34) interacting with the second detent element (32).

8. The belt buckle (10) according to claim 7, wherein the second locking element (34) is a land and/or in that the at least one second detent element (32) is formed by a slit having internal teeth and receiving the second locking element (34).

9. The belt buckle (10) according to claim 7, wherein plural second detent elements (32) and/or plural second locking elements (34) are provided.

10. The belt buckle (10) according to claim 9, wherein the plural second detent elements (32) are provided on a second side of the front panel (14) and/or the plural second locking elements (34) are provided on a second side of the belt buckle housing (12).

11. The belt buckle (10) according to claim 7, wherein the front panel (14) includes the at least one second detent element (32) and/or the belt buckle housing (12) includes the second locking element (34).

12. The belt buckle (10) according to claim 1, wherein the detent mechanism (24) comprises at least one first detent element (26), a first locking element (28) interacting with the first detent element (26), at least one second detent element (32) and a second locking element (34) interacting with the second detent element (32), and wherein the belt buckle housing (12) is configured at least in two parts, the first belt buckle housing part (52) including at least the first locking element (28).

13. The belt buckle (10) according to claim 12, wherein the belt buckle housing (12) includes the first locking element (28) and the second locking element (34).

14. The belt buckle (10) according to claim 1, wherein the front panel (14) comprises an application surface (40).

15. The belt buckle (10) according to claim 1, wherein both the diffuser (18) and the light conductor (16) are separate from each of the front panel (14) and the belt buckle housing (12) and held between the front panel (14) and the belt buckle housing (12) via only a clamping force between the front panel (14) and the belt buckle housing (12).

16. The belt buckle (10) according to claim 1, wherein the at least one detent mechanism (24, 30) comprises
    at least one first projection (26) extending from the front panel (14),
    at least one first slit (28) formed in the belt buckle housing (12) for receiving the at least one first projection (26),
    at least one second projection (34) extending from the belt buckle housing (12), and
    at least one second slit (32) formed in the front panel (14) for receiving the at least one second projection.

17. The belt buckle (10) according to claim 1, wherein the at least one detent mechanism (24, 30) comprises
    at least one projection (26) extending from the front panel (14) and having external teeth, and
    at least one slit (28) formed in the belt buckle housing (12), the external teeth interlocking in the at least one slit (28) when the at least one projection (26) is received in the at least one slit (28).

\* \* \* \* \*